United States Patent
Yang et al.

(10) Patent No.: US 10,074,486 B2
(45) Date of Patent: Sep. 11, 2018

(54) HIGH SPECIFIC CAPACITANCE CAPACITOR-GRADE TANTALUM POWDER WITH IMPROVED ELECTRICAL PROPERTIES AND PROCESS FOR MAKING THE SAME

(71) Applicants: NINGXIA ORIENT TANTALUM INDUSTRY CO., LTD., Shizuishan, Ningxia (CN); NATIONAL ENGINEERING RESEARCH CENTER FOR SPECIAL METAL MATERIALS OF TANTALUM AND NIOBIUM, Shizuishan, Ningxia (CN)

(72) Inventors: Guoqi Yang, Shizuishan (CN); Aiguo Zheng, Shizuishan (CN); Xueqing Chen, Shizuishan (CN); Fukun Lin, Shizuishan (CN)

(73) Assignees: NINGXIA ORIENT TANTALUM INDUSTRY CO., LTD., Shizuishan, Ningxia (CN); NATIONAL ENGINEERING RESEARCH CENTER FOR SPECIAL METAL MATERIALS OF TANTALUM AND NIOBIUM, Shizuishan, Ningxia (CN)

( * ) Notice: Subject to any disclaimer, the term of this patent is extended or adjusted under 35 U.S.C. 154(b) by 0 days.

(21) Appl. No.: 14/767,243

(22) PCT Filed: Dec. 25, 2013

(86) PCT No.: PCT/CN2013/090386
§ 371 (c)(1),
(2) Date: Aug. 11, 2015

(87) PCT Pub. No.: WO2015/096048
PCT Pub. Date: Jul. 2, 2015

(65) Prior Publication Data
US 2016/0314904 A1    Oct. 27, 2016

(51) Int. Cl.
*B32B 15/02*    (2006.01)
*H01G 9/042*    (2006.01)
(Continued)

(52) U.S. Cl.
CPC .......... *H01G 9/042* (2013.01); *B22F 1/0007* (2013.01); *B22F 9/04* (2013.01); *H01G 9/052* (2013.01);
(Continued)

(58) Field of Classification Search
None
See application file for complete search history.

(56) References Cited

U.S. PATENT DOCUMENTS 4,149,876 A    4/1979 Rerat
4,441,927 A    4/1984 Getz et al.
(Continued)

FOREIGN PATENT DOCUMENTS

CN    1131803        9/1996
CN    1197707 A      11/1998
(Continued)

OTHER PUBLICATIONS

International Search Report as issued for PCT/CN2013/090386.
(Continued)

*Primary Examiner* — Seth Dumbris
(74) *Attorney, Agent, or Firm* — Pillsbury Winthrop Shaw Pittman, LLP (57) ABSTRACT

A method for providing a tantalum powder with a piece+block structure, comprising the following steps: 1) providing a granulous tantalum powder, and dividing same into a first part and a second part; 2) putting the first part of the tantalum powder in a ball mill for ball milling, taking the powder out after the ball milling and sieving same, and obtaining a tantalum powder in the form of a piece; 3) mixing the
(Continued)

tantalum powder in the form of a piece and the second part of the tantalum powder to obtain a mixture, and preferably, the mixing proportion of the tantalum powder in the form of a piece and the granulous tantalum powder being 1:0.1~1, preferably being 1:0.25~0.8, and more preferably being 1:0.4~0.6; and 4) performing the steps of water washing, acid washing, and nodularization on the mixture to finally obtain a tantalum powder with a piece+block structure.

14 Claims, 2 Drawing Sheets

(51) Int. Cl.
*B22F 9/04* (2006.01)
*H01G 9/15* (2006.01)
*B22F 1/00* (2006.01)
*H01G 9/052* (2006.01)
*H01G 9/04* (2006.01)

(52) U.S. Cl.
CPC ............ *H01G 9/0525* (2013.01); *H01G 9/15* (2013.01); *B22F 2009/043* (2013.01); *B22F 2999/00* (2013.01); *H01G 2009/05* (2013.01); *Y10T 428/12014* (2015.01); *Y10T 428/12028* (2015.01); *Y10T 428/12035* (2015.01); *Y10T 428/12181* (2015.01)

(56) References Cited

U.S. PATENT DOCUMENTS

| | | | |
|---|---|---|---|
| 4,555,268 A | | 11/1985 | Getz |
| 4,740,238 A | * | 4/1988 | Schiele ................. B22F 1/0011 420/427 |
| 2010/0085685 A1 | * | 4/2010 | Pinwill ................. H01G 9/048 361/523 |
| 2013/0242465 A1 | | 9/2013 | Weaver et al. |

FOREIGN PATENT DOCUMENTS

| | | | |
|---|---|---|---|
| CN | 1240688 A | | 1/2000 |
| CN | 1899730 | | 1/2007 |
| CN | 102990076 | | 3/2013 |
| GB | 983346 | * | 2/1965 |

OTHER PUBLICATIONS

Second Office Action Chinese Patent Application No. 201380069646.9 dated Aug. 10, 2017 with full English translation.

Extended European Search Report EP Application No. 13900179.6 dated Jul. 25, 2017.

Communication pursuant to Rules 70(2) and 70a(2) EPC European Application No. 13900179.6 dated Aug. 11, 2017.

Office Action Chinese Patent Application No. 201380069646.9 dated Jul. 13, 2018 with English translation.

* cited by examiner

HIGH SPECIFIC CAPACITANCE CAPACITOR-GRADE TANTALUM POWDER WITH IMPROVED ELECTRICAL PROPERTIES AND PROCESS FOR MAKING THE SAME

CROSS REFERENCE TO RELATED APPLICATIONS

This application is the U.S. National Stage of PCT/CN2013/090386 filed Dec. 25, 2013, the entire contents of which is incorporated herein by reference in its entirety.

FIELD OF THE INVENTION

The invention relates to a high specific capacitance capacitor-grade tantalum powder and a high specific capacitance capacitor, more particularly, to a high specific capacitance capacitor-grade tantalum powder having a flake+block structure, an anode block prepared therefrom and a high specific capacitance capacitor comprising the anode block.

BACKGROUND OF THE INVENTION

Metal tantalum, being a valve metal, is able to form a dense oxidative film on its surface, so that the metal has the unilateral conduction property. Anode films prepared from the tantalum powder have stable chemical properties (particularly, the films are stable in an acidic electrolyte), a high electrical resistivity ($7.5 \times 10^{10}$ Ω·cm), a high dielectric constant (27.6), a small leakage current. In addition, the anode films further have the advantages of a broad working temperature range (from −80° C. to 200° C.), a high reliability, shock resistance, and a long life. Thus, tantalum powder is an ideal material for preparing tantalum capacitors having a small volume and a high reliability.

The process to prepare tantalum powder by reducing potassium fluorotantalate with sodium is a process for producing tantalum powder which is widely used all over the world and whose techniques are developed well.

The process of reducing potassium fluorotantalate with sodium is a process for making capacitor-grade tantalum powder in which $K_2TaF_7$ and Na are used as main raw materials, and NaCl, KCl and other halogen salts or a mixture of halogen salts are used as a diluent, and the main reaction mechanism of the process is shown as follows:

$$K_2TaF_7 + 5Na = Ta + 5NaF + 2KF \quad (1)$$

Under the argon protection and at a certain temperature, $K_2TaF_7$ and liquid sodium take the above reaction. After the resultant tantalum powder from the reduction is subjected to water washing and acid washing, the washed tantalum powder is subjected to thermal treatments, and then, after the deoxygenation (i.e., oxygen-lowering) reduction with magnesium, highly pure tantalum powder is finally obtained. Usually, tantalum powder particles obtained by the process are in the form of granular.

As well known, the specific capacitance of tantalum powder is proportional to the specific surface area thereof, that is, a lower average particle size of tantalum powder will lead to a higher specific surface area and a higher specific capacitance. The focus of current studies is on the controls of the formation, distribution and growth of crystal nucleus during the sodium reduction by controlling the reductive conditions, including components of dissolved salt of potassium fluorotantalate and diluent, reduction temperature, sodium-injection speed and so on, so as to prepare desirable tantalum powder having a specific surface area and a particle size. A mechanical process is to obtain tantalum powder having good pressure resistance by controlling conditions of hydrogenation pulverization or milling.

Generally, the flaking of tantalum powder and the simplification of particle shape of tantalum powder are novel means for increasing the pressure resistance of tantalum powder product, and at the same time, the volume reduction caused by the means should be attended to.

The patent U.S. Pat. No. 4,740,238 is concerned to an ingot-derived unagglomerated tantalum powder composition having an average Fisher sub-sieve size (FSSS) of less than two micrometers, preferably in the range of 0.6 to 1.1 micrometers, a Scott density not greater than 30 g/in³, and a BET surface area of at least 0.7 m²/g. In one embodiment of the invention, the powder is agglomerated and milled to form a tantalum powder product having a particle size of about 2 to 3 micrometers, a BET surface area of 0.43 m²/g, and a Scott density in the range of 18 to 27 g/in³.

The U.S. Pat. No. 4,940,490 relates to an improved flaked tantalum powder and process for making the flaked powder. The powder is characterized by having a Scott density greater than 18 g/in³ and preferably at least about 90% of the flake particles being no greater than 55 micrometers. Agglomerates of the flaked tantalum powder provide improved flowability, green strength and pressing characteristics compared to conventional flaked tantalum powders.

The patent application WO93/03191 mentions an improved flaked tantalum powder and process for making the flaked powder. The powder is characterized by having a mean particle size (FSSS) in the range of 2 to 55 micrometers and a BET surface area in the range of 0.5 to 5.0 m²/g. The mean particle size and BET surface area are selected so that the flakes have an aspect ratio (D/T) in the range of 2 to 50. Agglomerates of the flaked tantalum powder provide improved flowability.

The patent U.S. Pat. No. 5,211,741 mentions an improved flake tantalum powder and a method for making a fractured flake tantalum powder. The tantalum powder is characterized by having a Scott density greater than 18 g/in³ and preferably at least 90% of the flake particles being no greater than 55 micrometers.

Agglomerates of the flaked tantalum powder provide improved flowability, green strength and pressing characteristics compared to conventional flaked tantalum powders.

The U.S. Pat. No. 5,261,942 also mentions an improved flake tantalum powder and a method for making a flake tantalum powder. The tantalum powder is characterized by having a Scott density greater than 18 g/in³ and preferably at least 90% of the flake particles being no greater than 55 micrometers. Agglomerates of the flaked tantalum powder provide improved flowability, green strength and pressing characteristics compared to conventional flaked tantalum powders. The patent U.S. Pat. No. 5,580,367 also is similar to the patent U.S. Pat. No. 4,940,490.

The patent U.S. Pat. No. 4,441,927 mentions an ingot-derived agglomerated tantalum powder composition comprising a select granular tantalum powder and including a critical proportion of a flaked tantalum powder.

The patent CN101491834A relates to a tantalum powder, a preparation method thereof and an electrolytic capacitor anode made of the tantalum powder, in particular to tantalum powder of which the BET specific surface area is not more than 0.530 m²/g and the Fisher mean particle diameter is not less than 3.00 nm. The invention also relates to the method for preparing the tantalum powder, wherein the tantalum powder is prepared by using a reducing agent to reduce a tantalum compound. The method is characterized in that tantalum powder which is taken as a crystal seed is added during reduction, which is a ground tantalum powder.

The patent WO2004110684A2 describes methods of forming tantalum powders and other valve metal powders are described. The method involves high impact milling a starting powder in a fluid medium and optionally a milling media using a high energy mill. The methods of the present invention have the ability to reduce DC leakage and/or increase capacitance capabilities of valve metal powders when formed into capacitor anodes.

The patent U.S. Pat. No. 4,555,268 relates to flaked tantalum powder having improved performance. The powder contains flaked tantalum powder and granular tantalum powder. Prior to the mixing, the mixed tantalum powder are subjected to secondary agglomeration at temperatures range from 1250° C. to 1550° C. for a period ranging from 5 to 120 minutes, so as to improve the workability.

There are many patents relating to the preparation of flaked tantalum powder from tantalum powder, however, they focus substantially on the pure flake tantalum powder. Furthermore, these processes are primarily directed to tantalum powder having a low specific capacitance of less than 30,000 μFV/g.

SUMMARY OF THE INVENTION

One aim of the invention is to provide a capacitor-grade tantalum powder having a high specific capacitance in the range of 30,000 to 80,000 μFV/g. Another aim of the invention is to reduce the leakage current of tantalum powder. A further aim of the invention is to maintain a relatively high specific capacitance while reducing the loss and leakage current of tantalum powder, and that is to say, to achieve improved combination properties of the loss, leakage current and specific capacitance.

The present invention provides a tantalum powder having a flake+block structure, comprising flake tantalum powder and granular tantalum powder, wherein the ratio of the flake tantalum powder to the granular tantalum powder is in the range from 1:0.1 to 1, such as from 1:0.25 to 1, or 1:0.4 to 0.9, e.g., from 1:0.5 to 9.

Preferably, in said tantalum powder, the proportion of −400 mesh tantalum powder is from 20 to 40%, preferably from 25 to 35%, and more preferably from 28 to 33%.

The process according to the invention comprises the steps of:
1) providing a granular tantalum powder and dividing it to a first portion of tantalum powder and a second portion of tantalum powder;
2) charging the first portion of tantalum powder into a milling machine, and after the milling, taking the powder out and screening it to give a flaked tantalum powder;
3) mixing the flaked tantalum powder with the second portion of tantalum powder to give a mixture; and
4) subjecting the mixture to water washing, acid washing, and agglomeration.

In a certain embodiment of the invention, the tantalum powder in the step 1) is produced by the process of reducing potassium fluorotantalate with sodium.

In a certain embodiment of the invention, the tantalum powder in the step 1) has a capacitance ranging from 30,000 to 80,000 μFV/g. Granular tantalum powder having such a capacitance are commercially available.

In a certain embodiment of the invention, prior to the step 1), the tantalum powder obtainable from the reduction of potassium fluorotantalate with sodium is subjected to acid washing, to remove the impurities therein, and then the washed powder is subjected to flaking treatment.

In a preferred embodiment, the tantalum powder in the step 1) has a particle size ranging from 0.3 to 3.0 μm, preferably from 0.5 to 2.5 μm. Tantalum powder having such a particle size may be commercially available. Tantalum powder having a desired particle size can also be obtained by controlling the ratio of potassium fluorotantalate to diluent salt, e.g., KCl and the like, reaction temperature, feeding speed and other parameters during the reduction of potassium fluorotantalate with sodium. Not limited to general theories, the particle size of tantalum powder raw material is believed to be able to influence the size of the flake of milled crude powder, so as to influence the physical properties and electrical performance index of corresponding product to an extent.

The milling process in the step 2) is not particularly limited, as long as it can produce flaked tantalum powder.

However, in a preferred embodiment of the invention, a stainless steel ball is used as the grinding body during the milling.

In a preferred embodiment of the invention, a liquid milling agent medium is further used during the milling. Generally, the liquid milling agent may be selected from some substances having a high dispersibility, e.g., alcohol.

However, the increased specific capacitance of tantalum powder requires the milling time longer and longer, and accordingly, tantalum powder is finer and finer. Hence, it can be determined that addition amount of the liquid milling agent and effective acid washing system will reduce chemical impurities in the tantalum powder, especially to reduce iron, carbon contents which are necessary.

Preferably, a stainless steel ball is used as the grinding body, and more preferably, the weight ratio of the stainless steel ball to the first portion of tantalum powder is in the range of 3-10:1, more preferably 5-7:1. Preferably, the weight ratio of the first portion of tantalum powder to the liquid milling agent is 1:0.5-2.5, more preferably, 1:1.5-2.0.

Different milling time periods in use will lead to obviously different sizes, shapes, strengths of prepared flakes. When the milling time is too short, it will easily result in large and uniform flakes, and insufficient flaking, and a low flaking efficiency; when the milling time is too long, it will easily result in overly fine flakes, superposition, thereby to cause poor electrical performances and physical properties of corresponding product. Hence, it may be necessary to select a suitable milling time. It is desirable that the milling time is controlled in 5 to 20 hours, more preferably in 12 to 18 hours, and most preferably, in 13 to 16 hours.

In a preferred embodiment of the invention, prior to the screening in the step 2), the powder is subjected to water washing and acid washing to remove impurities therein. Preferably, after the step 4), the resultant tantalum powder having the flake+block structure is subject to the pre-agglomeration, heat treatment, and oxygen reduction.

Preferably, in step 3) the mixing ratio of the flake tantalum powder to the granular tantalum powder is from 1:0.1-1, such as, 1:0.25 to 1, or 1:0.4 to 0.9. The inventor surprisingly finds out that in the view of the improvement of the leakage current, the mixing ratio of the flake tantalum powder to the granular tantalum powder should 1:0.25 to 1, preferably 1:0.4-0.9.

It should be understood that the term "tantalum powder having the flake+block structure" is meant to refer to tantalum powder comprising flake particles and block (or rather, granular) particles.

The term "flaked" means that tantalum powder particles exhibit the appearance in the flake shape.

In the text, the terms "flaked tantalum powder", "flake tantalum powder", and "flake powder" can be used for being substituted with each other.

In a certain embodiment of the invention, a low leakage current is realized. In a certain embodiment of the invention, a low loss can be realized. In a preferred embodiment of the invention, a desirable specific capacitance is still maintained while low loss and low leakage current are realized.

One or more of the above aims are realized by the process, so that requirements of capacitors products on tantalum powder are met, particularly the requirements in the aspect of voltage resistance and leakage current.

EMBODIMENTS OF THE INVENTION

In the art, a physical parameter which is used to describe the fineness of metallic particles is the average Fisher sub-sieve size (FSSS, which is also called Fisher mean particle size) measured by a Fisher sub-sieve meter. The average Fisher sub-sieve size is obtained by measuring the flow rate of powder filled in a metal tube by the gas penetration method in a Fisher sub-sieve meter. On one hand, the physical parameter is relevant to the size of the particles, and on the other hand, it is relevant to the agglomeration strength of powder. As to the same tantalum powder obtained by reducing potassium fluorotantalate with sodium, the lower average Fisher sub-sieve size will lead to a higher specific surface area. Furthermore, as to agglomerated metal powder, the powder having different specific surface area may have similar average Fisher sub-sieve size. As to powder in the same grade, agglomerated powder has a larger average Fisher sub-sieve size.

The Fisher sub-sieve size (FSSS/μm) of the tantalum powder in accordance with the invention is measured according to the method prescribed in the standard "Standard Method for Determination of Particle Size of Powders of Refractory Metals and Compounds—Fisher Method (the serial number of the standard: GB/T3249)"; the bulk density (SBD) is measured by the method prescribed in the standard "Metallic Powder—Determination of Bulk Density—Part I: Funnel Method (the serial number of the standard: GB/T1479)"; the particle size distribution is measured by the method prescribe in the standard "Determination of Particle Size for Metallic Powders—Dry sieving (the serial number of the standard: GB/T1480); the sampling process is conducted according to the method as prescribed in the standard "sampling for Powder Metallurgical Purposes—Sampling" (the serial number of the standard: GB/T5314).

In the invention, the elements in tantalum powder are detected according to methods as prescribed in National Standard of the People's Republic of China. These standards include "GB/T 15076.8-2008 Methods for Chemical Analysis of Tantalum and Niobium—Determination of Carbon and Sulphur Contents", "GB/T 15076.9-2008 Methods for Chemical Analysis of Tantalum and Niobium—Determination of Iron, Chromium, Nickel, Manganese, Titanium, Aluminum, Copper, Tin, Lead, and Zirconium Contents in Tantalum", "GB/T 15076.12-2008 Methods for Chemical Analysis of Tantalum and Niobium—Determination of Phosphorous Content", "GB/T 15076.14-2008 Methods for Chemical Analysis of Tantalum and Niobium—Determination of Oxygen Content", "GB/T 15076.15-2008 Methods for Chemical Analysis of Tantalum and Niobium—Determination of Hydrogen Content", and "GB/T 15076.16-2008, Methods for Chemical Analysis of Tantalum and Niobium—Determination of Sodium and Potassium Contents".

In the invention, detecting methods and apparatus for the electrical properties of tantalum powder are measured according to the National Standard "GB/T 3137-2007 Testing Method for Electrical Properties of Tantalum Powder".

Another physical parameter which is used to describe the fineness of metal particles is the specific surface area ($m^2/g$) as measured by a BET low-temperature nitrogen absorption.

The inventors further surprisingly find out that if an effective pre-agglomeration process is used after the step 3), the bulk density of samples and the proportion of −400 mesh particles can be improved in a great extent. The inventor surprisingly find out that if the proportion of the −400 mesh particles is too high, the proportion will result in problems of poor flowing property, and poor shaping homogeneity of the tantalum powder; if the proportion of −400 mesh particles is too low, the proportion will result in that the shaped anode block has a rough surface, and its edge is ready to collapse. For the invention, the proportion of −400 mesh particles would be controlled in the range of from 20 to 40%, and in the case, the better effects that the physical properties of samples can be obviously improved; the proportion can be advantageous to the sintering and shaping of powder; and the proportion can increase the applicability of samples to customers. After the pre-agglomeration, the tantalum powder is subjected to thermal treatment agglomeration, deoxygenation (860° C.-960° C./heat preservation 1-4 hours, de-magging under gas evacuation for 1-4 hours), and after the above steps, desirable tantalum powder is finally produced.

In a certain embodiment of the invention, the thermal treatment agglomeration is conducted by keeping at 1000° C. for a period of from 30 to 60 minutes, and then raising the temperature and keeping at 1300 to 1450° C. for a period of from 30 to 90 minutes.

In a certain embodiment of the invention, the deoxygenation (also referred to oxygen-lowering in the art) is conducted by keeping at 860° C. to 960° C. for a period of from 1 to 4 hours, and then de-magging under gas evacuation for a period of from 1 to 4 hours.

In order to further explain the invention, the embodiments of the invention are described by combining the following examples and tables. However, it should be understood that these descriptions are used to further describe the features and advantages of the invention, but not for limitations to the scope of the claims of the invention.

Example 1

Commercially available crude tantalum powder having a high specific capacitance of 40000 μFV/g (i.e., the tantalum powder which is not subjected to the thermal treatment agglomeration after the reduction) is used in the example as raw material. The tantalum powder is divided into two portions. Then, the first portion is acid washed to remove impurities therein, and following this, the portion of tantalum powder is subjected flaking treatment. The flaking treatment is conducted by using a stirring milling method. The grinding body is a Φ2 mm stainless steel ball; the liquid milling agent medium is alcohol; the milling time is 15 hours; the weight ratio of the steel ball to the tantalum powder is 6:1, and the weight ratio of the tantalum powder to the liquid milling agent is 1:1.8; and the rotating speed used in the milling is 100 r/m.

After the milling, the milled powder is separated from the grinding body. Then, the separated powder is subjected to water washing and acid washing to remove impurities therein, and the particles of tantalum powder are dispersed by mesh screening to give a flaked tantalum powder. The resultant tantalum powder is uniformly mixed with the second portion of tantalum powder in the ratio of 1:1, and the mixture is further subjected to pre-agglomeration, thermal treatment agglomeration, and oxygen-lowering process to produce tantalum powder having the flake +block structure. The thermal treatment agglomeration conditions used in the example include keeping at 1350° C. for a period of 40 min, and the oxygen-lowering conditions include keeping at 900° C. for a period of 180 min and gas evacuation for a period of 180 min.

Example 2

Commercially available crude tantalum powder having a high specific capacitance of 40000 μFV/g (i.e., the tantalum powder which is not subjected to the thermal treatment agglomeration after the reduction) is used in the example as raw material. The tantalum powder is divided into two portions. Then, the first portion is acid washed to remove impurities therein, and following this, the portion of tantalum powder is subjected to flaking treatment. The flaking treatment is conducted by using a stirring milling method. The grinding body is a Φ2 mm stainless steel ball; the liquid milling agent medium is alcohol; the milling time is 15 hours; the weight ratio of the steel ball to the tantalum powder is 6:1, and the weight ratio of the tantalum powder to the liquid milling agent is 1:1.8; and the rotating speed used in the milling is 100 r/m.

After the milling, the milled powder is separated from the grinding body. Then, the separated powder is subjected to water washing and acid washing to remove impurities therein, and the particles of tantalum powder are dispersed by mesh screening to give a flaked tantalum powder. The resultant tantalum powder is uniformly mixed with the second portion of tantalum powder in the ratio of 1:0.75, and the mixture is further subjected to pre-agglomeration, thermal treatment agglomeration, and oxygen-lowering process to produce tantalum powder having the flake +block structure. The thermal treatment agglomeration conditions used in the example include keeping at 1350° C. for a period of 40 min, and the oxygen-lowering conditions include keeping at 900° C. for a period of 180 min and gas evacuation for a period of 180 min.

Example 3

Commercially available crude tantalum powder having a high specific capacitance of 40000 μFV/g (i.e., the tantalum powder which is not subjected to the thermal treatment agglomeration after the reduction) is used in the example as raw material. The tantalum powder is divided into two portions. Then, the first portion is acid washed to remove impurities therein, and following this, the portion of tantalum powder is subjected to flaking treatment. The flaking treatment is conducted by using a stirring milling method. The grinding body is a Φ2 mm stainless steel ball; the liquid milling agent medium is alcohol; the milling time is 15 hours; the weight ratio of the steel ball to the tantalum powder is 6:1, and the weight ratio of the tantalum powder to the liquid milling agent is 1:1.8; and the rotating speed used in the milling is 100 r/m.

After the milling, the milled powder is separated from the grinding body. Then, the separated powder is subjected to water washing and acid washing to remove impurities therein, and the particles of tantalum powder are dispersed by mesh screening to give a flaked tantalum powder. The resultant tantalum powder is uniformly mixed with the second portion of tantalum powder in the ratio of 1:0.50, and the mixture is further subjected to pre-agglomeration, thermal treatment agglomeration, and oxygen-lowering process to produce tantalum powder having the flake +block structure. The thermal treatment agglomeration conditions used in the invention include keeping at 1350° C. for a period of 40 min, and the oxygen-lowering conditions include keeping at 900° C. for a period of 180 min and gas evacuation for a period of 180 min.

Example 4

Commercially available crude tantalum powder having a high specific capacitance of 40000 μFV/g (i.e., the tantalum powder which is not subjected to the thermal treatment agglomeration after the reduction) is used in the example as raw material. The tantalum powder is divided into two portions. Then, the first portion is acid washed to remove impurities therein, and following this, the portion of tantalum powder is subjected to flaking treatment.

The flaking treatment is conducted by using a stirring milling method. The grinding body is a Φ2 mm stainless steel ball; the liquid milling agent medium is alcohol; the milling time is 15 hours; the weight ratio of the steel ball to the tantalum powder is 6:1, and the weight ratio of the tantalum powder to the liquid milling agent is 1:1.8; and the rotating speed used in the milling is 100 r/m.

After the milling, the milled powder is separated from the grinding body. Then, the separated powder is subjected to water washing and acid washing to remove impurities therein, and the particles of tantalum powder are dispersed by mesh screening to give a flaked tantalum powder. The resultant tantalum powder is uniformly mixed with the second portion of tantalum powder in the ratio of 1:0.25, and the mixture is further subjected to pre-agglomeration, thermal treatment agglomeration, and oxygen-lowering process to produce tantalum powder having the flake +block structure. The thermal treatment agglomeration conditions used in the invention include keeping at 1350° C. for a period of 40 min, and the oxygen-lowering conditions include keeping at 900° C. for a period of 180 min and gas evacuation for a period of 180 min.

Example 5

Commercially available crude tantalum powder having a high specific capacitance of 70000 μFV/g (i.e., the tantalum powder which is not subjected to the thermal treatment agglomeration after the reduction) is used in the example as raw material. The tantalum powder is divided into two portions. Then, the first portion is acid washed to remove impurities therein, and following this, the portion of tantalum powder is subjected to flaking treatment. The flaking treatment is conducted by using a stirring milling method. The grinding body is a Φ2 mm stainless steel ball; the liquid milling agent medium is alcohol; the milling time period is 18 hours; the weight ratio of the steel ball to the tantalum powder is 6:1, and the weight ratio of the tantalum powder to the liquid milling agent is 1:2.0; and the rotating speed used in the milling is 100 r/m.

After the milling, the milled powder is separated from the grinding body. Then, the separated powder is subjected to water washing and acid washing to remove impurities therein, and the particles of tantalum powder are dispersed by mesh screening to give a flaked tantalum powder. The resultant tantalum powder is uniformly mixed with the second portion of tantalum powder in the ratio of 1:0.45, and the mixture is further subjected to pre-agglomeration, thermal treatment agglomeration, and oxygen-lowering process to produce tantalum powder having the flake +block structure. The thermal treatment agglomeration conditions used in the invention include keeping at 1350° C. for a period of 40 min, and the oxygen-lowering conditions include keeping at 900° C. for a period of 180 min and gas evacuation for a period of 180 min.

Example 6

Commercially available crude tantalum powder having a high specific capacitance of 70000 μFV/g (i.e., the tantalum powder which is not subjected to the thermal treatment agglomeration after the reduction) is used in the example as raw material. The tantalum powder is divided into two portions. Then, the first portion is acid washed to remove impurities therein, and following this, the portion of tantalum powder is subjected to flaking treatment. The flaking treatment is conducted by using a stirring milling method. The grinding body is a Φ2 mm stainless steel ball; the liquid milling agent medium is alcohol; the milling time period is 18 hours; the weight ratio of the steel ball to the tantalum powder is 6:1, and the weight ratio of the tantalum powder to the liquid milling agent is 1:2.0; and the rotating speed used in the milling is 100 r/m.

After the milling, the milled powder is separated from the grinding body. Then, the separated powder is subjected to water washing and acid washing to remove impurities therein, and the particles of tantalum powder are dispersed by mesh screening to give a flaked tantalum powder. The resultant tantalum powder is uniformly mixed with the second portion of tantalum powder in the ratio of 1:0.30, and the mixture is further subjected to pre-agglomeration, thermal treatment agglomeration, and oxygen-lowering process to produce tantalum powder having the flake +block structure. The thermal treatment agglomeration conditions used in the invention include keeping at 1350° C. for a period of 40 min, and the oxygen-lowering conditions include keeping at 900° C. for a period of 180 min and gas evacuation for a period of 180 min.

Comparative Example 1

Commercially available crude tantalum powder having a high specific capacitance of 40000 μFV/g (i.e., the tantalum powder which is not subjected to the thermal treatment agglomeration after the reduction) is used in the example as raw material. The tantalum powder is subjected to acid washing, and then the washed powder is subjected to pre-agglomeration, thermal treatment agglomeration, and oxygen-lowering process according to conventional production processes to produce tantalum powder produced by conventional processes. The thermal treatment agglomeration conditions used in the example include keeping at 1350° C. for a period of 40 min, and the oxygen-lowering conditions include keeping at 900° C. for a period of 180 min and gas evacuation for a period of 180 min.

Comparative Example 2

Commercially available crude tantalum powder having a high specific capacitance of 70000 μFV/g (i.e., the tantalum powder which is not subjected to the thermal treatment agglomeration after the reduction) is used in the example as raw material. The tantalum powder is subjected to acid washing, and then the washed powder is subjected to pre-agglomeration, thermal treatment agglomeration, and oxygen-lowering process according to conventional production processes to produce tantalum powder produced by conventional processes. The thermal treatment agglomeration conditions used in the example include keeping at 1260° C. for a period of 30 min, and the oxygen-lowering conditions include keeping at 900° C. for a period of 180 min and gas evacuation for a period of 180 min, the oxygen-lowering process being repeated twice.

After tests, individual physical properties in Examples 1-4 and Comparative Example 1 are shown in Table 1

TABLE 1

Individual physical properties of tantalum powder

| Samples | Fsss (μm) | SBD (g/cc) | +80 (%) | −400 (%) |
|---|---|---|---|---|
| Example 1 | 2.75 | 1.66 | 0.10 | 28.34 |
| Example 2 | 2.85 | 1.62 | 0.36 | 32.64 |
| Example 3 | 3.04 | 1.60 | 0.24 | 27.10 |
| Example 4 | 3.18 | 1.56 | 0.16 | 28.20 |
| Comparative Example 1 | 2.46 | 1.65 | 0.08 | 25.48 |

In the table, the "Fsss" (μm) represents the Fisher sub-sieve size; the "SBD (g/cc)" represents the bulk density; the "+80(%)" represents the proportion of tantalum powder with the size of greater than 80 meshes; and the "−400(%)" represents the portion of tantalum powder with the size of less than 400 meshes.

With comparisons and analyses, it is found the Fisher sub-sieve sizes of tantalum powder in the examples are greater than that of tantalum powder in the comparative example. Furthermore, with the increase of the proportion of the flaked tantalum powder, the Fisher sub-sieve size of the tantalum powder is increased, and electrical properties, e.g., leakage current and loss, can be improved. As to other physical properties, e.g., the bulk density, the proportion of +80 mesh tantalum powder, and the proportion of −400 mesh tantalum powder, the examples are comparable to the comparative example.

After tests, amounts of primary impurities in the tantalum powder of Examples 1-4 and Comparative Example 1 are shown in Table 2

TABLE 2

Amounts of primary impurities in tantalum powder (unit: ppm)

| sample | Chemical impurities | | | | | |
|---|---|---|---|---|---|---|
| | O | C | N | Fe | K | H |
| Example 1 | 2750 | 26 | 150 | 17 | 8 | 72 |
| Example 2 | 2630 | 26 | 170 | 15 | 6 | 93 |
| Example 3 | 2560 | 24 | 130 | 14 | 9 | 90 |
| Example 4 | 2450 | 23 | 110 | 15 | 8 | 78 |
| Comparative Example 1 | 2780 | 20 | 140 | 12 | 12 | 86 |

With comparisons and analyses, it is found the oxygen contents in the tantalum powder of the examples are reduced with the increase of the proportion of flaked tantalum powder in the tantalum powder, and as a whole, the oxygen contents in the examples are lower than the oxygen content in comparative Example 1. Not restricted by general theories, the inventor considers that generally, the specific surface area is relevant to the oxygen content, that is, the lower specific surface will be lead to easier controls of a lower oxygen content. The fact shows that the specific surface areas in the examples are lower than the specific surface area in the comparative example. As to the contents of other impurities, such as, C, N, Fe, etc., the examples are comparable to the comparative example.

The above powder sample is compressed. The density of resulting briquette is 5.0 g/cm$^3$, and the weight of the core powder is 0.25 g. The molder in use is a molder with Φ4 mm. The compressed powder sample is sintered at 1400° C. for a period of 10 minutes at a vacuum furnace of 10$^{-3}$ Pa to give a sintered block, and then the sintered block is energized in a 0.1% phosphoric acid solution at 70 V for a period of 120 minutes, in which the energizing temperature is 80° C., and the current density is 150 mA/g. Other properties are measured according National Standard GB/T 3137-2007. The specific capacitances of individual samples are listed in Table 3.

After tests, the electrical properties of the tantalum powder in Examples 1-4 and Comparative Example 1 are shown in Table 3.

TABLE 3 comparisons of electrical properties of tantalum powder

| Samples | K (nA/μFV) | CV (μFV/g) | tgδ (%) | SHD (%) | SHV (%) |
|---|---|---|---|---|---|
| Example 1 | 0.21 | 38068 | 13.8 | 3.0 | 8.0 |
| Example 2 | 0.20 | 37880 | 13.5 | 2.8 | 7.6 |
| Example 3 | 0.19 | 37654 | 12.6 | 1.5 | 2.5 |
| Example 4 | 0.27 | 35280 | 12.2 | 1.0 | 1.0 |
| Comparative Example 1 | 0.34 | 38162 | 16.8 | 3.2 | 8.5 |

In the table, the "K(nA/μFV)" represents the leakage current; the "CV(μFV/g)" represents the capacitance; the "tgδ(%)" represents the loss; the "SHD" represents the radical contraction rate; and "SHV (%)" represents the volume contraction rate.

As seen from Table 3, the leakage current in the examples is reduced with the increase of the proportion of flaked tantalum powder in the tantalum powder, and as a whole, the leakage current in the examples is lower than the leakage current in comparative Example 1. The fact shows that the tantalum powder obtained by the process has a low leakage current and a low loss, and thus the performances of the product are improved.

Figure 1:
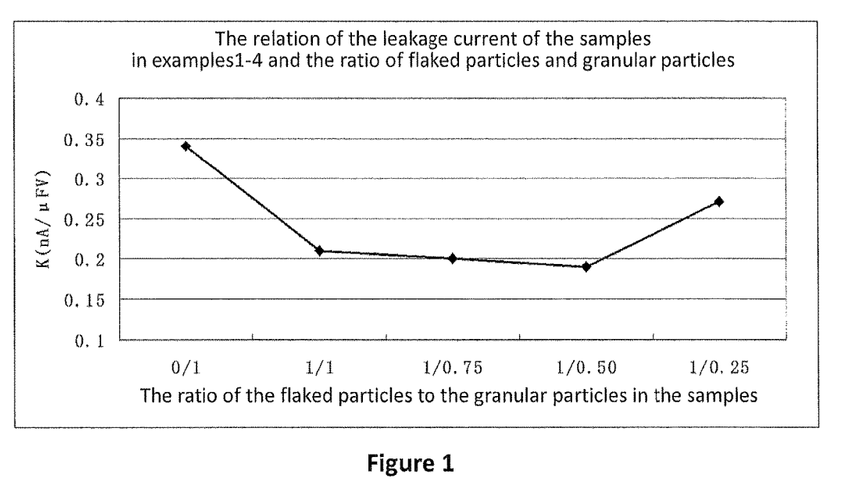
FIG. 1 is a diagram to show the variations of the leakage current of the samples in Examples 1-4 with the ratios of the flake powder to granular powder ratio.

As seen from FIG. 1, the leakage current in the examples is reduced with the increase of the proportion of flaked tantalum powder in the tantalum powder, and as a whole, the leakage current in the examples is lower than the leakage current in comparative example. However, when the proportion of flaked tantalum powder is close to or higher than 80% (see Example 4), the leakage current of tantalum powder samples is increased (still superior to the leakage current in Comparative Example 1).

Figure 2:
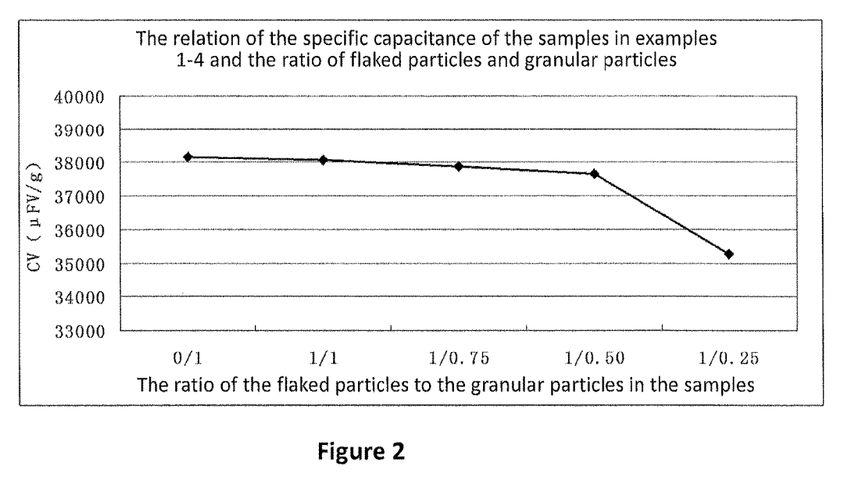
FIG. 2 is a diagram to show the variations of the specific capacitance of the samples in Examples 1-4 with the ratios of the flake powder to granular powder ratio.

As seen from FIG. 2, the specific capacitances in the examples are slightly reduced, and it is still comparable to that in Comparative Example 1. However, when the proportion of the flaked tantalum powder is 33.33%, the specific capacitance begins to decrease. Hence, in view of the specific capacitance, the ratio of the flaked tantalum powder to the granular tantalum powder should be 1:0.5-1.

Figure 3:
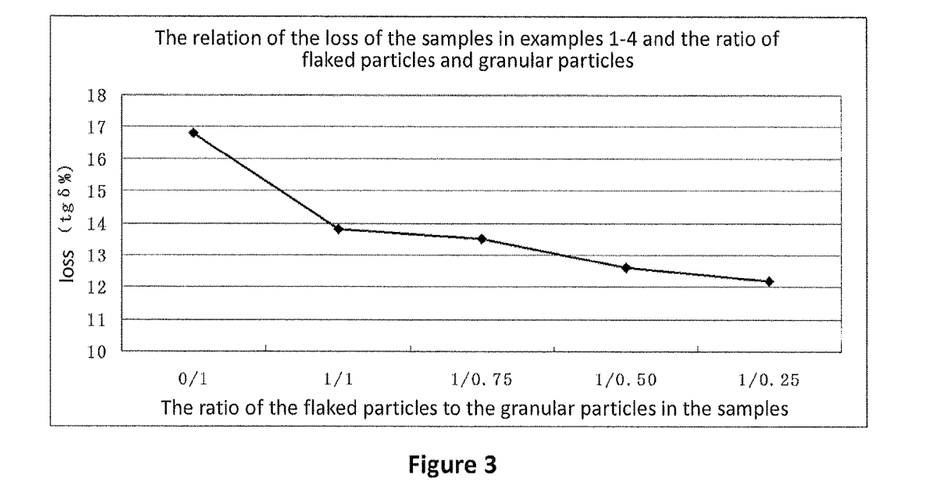
FIG. 3 is a diagram to show the variations of the loss of the samples in Examples 1-4 with the ratios of the flake powder to granular powder ratio.

As seen from FIG. 3, the loss of tantalum powder has a monotonic relation with the proportion of the flaked powder.

After tests, individual physical properties of tantalum powder in Examples 5-6 and Comparative Example 2 are shown in Table 4.

TABLE 4

Individual physical properties of tantalum powder

| Sample | Fsss (μm) | SBD (g/cc) | +80 (%) | −400 (%) |
|---|---|---|---|---|
| Example 5 | 2.52 | 1.76 | 0.50 | 25.52 |
| Example 6 | 2.65 | 1.72 | 0.24 | 26.30 |
| Comparative example 2 | 2.36 | 1.75 | 0.20 | 24.60 |

In the table, the "Fsss(μm)" represents the Fisher sub-sieve size; the "SBD(g/cc)" represents the bulk density; the "+80(%)" represents the proportion of tantalum powder with the size of greater than 80 meshes; and the "−400(%)" represents the portion of tantalum powder with the size of less than 400 meshes.

With comparisons and analyses, it is found the Fisher sub-sieve sizes of tantalum powder in the examples are greater than that of tantalum powder in the comparative example. Furthermore, with the increase of the proportion of the flaked tantalum powder, the Fisher sub-sieve size of the tantalum powder is increased, and the corresponding particle shape becomes simpler. As to other physical properties, e.g., the bulk density, the proportion of +80 mesh tantalum powder, and the proportion of −400 mesh tantalum powder, the examples are comparable to the comparative example.

After tests, the amounts of primary impurities in tantalum powder of Examples 5-6 and Comparative Example 2 are shown in Table 5.

TABLE 5

Amounts of primary impurities in tantalum powder

| | Chemical impurity | | | | | |
|---|---|---|---|---|---|---|
| Sample | O | C | N | Fe | K | H |
| Example 5 | 4182 | 28 | 310 | 18 | 16 | 160 |
| Example 6 | 3926 | 29 | 280 | 16 | 15 | 170 |
| Comparative Example 2 | 4312 | 25 | 400 | 15 | 19 | 160 |

With comparisons and analyses, it is found the oxygen contents in the tantalum powder of the examples are reduced with the increase of the proportion of flaked tantalum powder in the tantalum powder, and as a whole, the oxygen contents in the examples are lower than the oxygen content in comparative Example 2. The fact demonstrates that the specific surface areas in the examples are lower than the specific area in the comparative example. As to the contents of other impurities, such as, C, N, Fe, etc., the examples are comparable to the comparative example.

The above powder sample is compressed. The density of resulting briquette is 5.5 g/cm$^3$, and the weight of the core powder is 0.15 g. The molder in use is a molder with Φ3 mm. The compressed powder sample is sintered at 1320° C. for a period of 10 minutes in a furnace with 10$^{-3}$ Pa vacuum to give a sintered block, and then the sintered block is energizeding a 0.15% phosphoric acid solution at 30 V for a period of 120 minutes, in which the energizing temperature is 85° C., and the current density is 150 mA/g. Other properties are measured according National Standard GB/T 3137-2007. The specific capacitances of individual samples are listed in Table 6.

After tests, the electrical properties of the tantalum powder in Examples 5-6 and Comparative Example 2 are shown in Table 6.

TABLE 6 comparisons of electrical properties of tantalum powder

| Sample | K (nA/μFV) | CV (μFV/g) | tgδ (%) | SHD (%) | SHV (%) |
|---|---|---|---|---|---|
| Example 5 | 0.33 | 67056 | 47.8 | 3.0 | 8.0 |
| Example 6 | 0.30 | 65785 | 43.5 | 2.8 | 7.6 |
| Comparative Example 2 | 0.39 | 67120 | 52.8 | 3.3 | 8.5 |

In the table, the "K(nA/μFV)" represents the leakage current; the "CV(μFV/g)" represents the capacitance; the "tgδ(%)" represents the loss; the "SHD" represents the radical contraction rate; and "SHV (%)" represents the volume contraction rate.

As seen from Table 6, the leakage current in the examples is reduced with the increase of the proportion of flaked tantalum powder in the tantalum powder, and as a whole, the leakage current in the examples is lower than the leakage current in comparative Example 1. The fact shows that the tantalum powder obtained by the process has a low leakage current and a low loss, and thus the performances of the product are improved.

The analytical data demonstrates that the process of the invention increase the characteristic of tantalum powder of voltage resistance, reduce the leakage current, and reduce the loss. Thus, the process meets the requirements of capacitor products on tantalum powder in the aspect of voltage resistance and leakage current. The claimed product is suitable for the tantalum powder having a specific capacitance of 30000 to 80000 μFV/g.

The description and examples of the invention as disclosed herein are illustrative. Furthermore, it is obvious for a person skilled in the art that the invention may involve other embodiments, and the essential scope and spirit of the invention is determined by the claims.

The invention claimed is:

1. A process of providing tantalum powder having a flake+block structure, comprising the steps of:
   1) providing a granular tantalum powder and dividing it to a first portion of tantalum powder and a second portion of tantalum powder;
   2) charging the first portion of tantalum powder into a milling machine and milling the tantalum powder, and after the milling, taking the tantalum powder out and screening it to give a flaked tantalum powder;
   3) mixing the flaked tantalum powder with the second portion of the granular tantalum powder to give a mixture, wherein the mixing ratio of the flake tantalum powder to the granular tantalum powder is from 1:0.4 to 1:0.9; and
   4) subjecting the mixture to water washing, acid washing, and agglomeration to produce a tantalum powder having a flack+block structure wherein the proportion of −400 mesh tantalum powder having a flake+block structure is from 20 to 40%.

2. The process according to claim 1, wherein the tantalum powder in the step 1) is produced by a process of reducing potassium fluorotantalate with sodium.

3. The process according to claim 1, wherein the tantalum powder in the step 1) has a specific capacitance ranging from 30,000 to 80,000 μFV/g, and/or has a particle size of from 0.3 to 3.0 μm.

4. The process according to claim 1 or 2, wherein prior to the step 1), the tantalum powder is subjected to acid washing, to remove impurities therein.

5. The process according to claim 1, wherein during the milling in the step 2), a stainless steel ball is used as a grinding body, and alcohol is used as a liquid milling agent medium.

6. The process according to claim 5, wherein the weight ratio of the stainless steel ball to the first portion of tantalum powder is in the range of 3-10:1, and the weight ratio of the first portion of tantalum powder to the liquid milling agent is 1:0.5-2.5.

7. The process according to claim 1, wherein the tantalum powder is milled for a period of 5 to 20 hours.

8. The process according to claim 1, wherein prior to the screening in the step 2), the tantalum powder is subjected to water washing and acid washing to remove impurities therein.

9. A tantalum powder having the flake +block structure obtained by the process according to claim 1.

10. A tantalum powder having a flake+block structure, comprising flake tantalum powder and granular tantalum powder, wherein the mixing ratio of the flake tantalum powder to the granular tantalum powder is from 1:04 to 1:0.9, wherein the proportion of −400 mesh tantalum powder having a flake+block structure is from 20 to 40%.

11. The tantalum powder according to claim 10, wherein the mixing ratio of the flake tantalum powder to the granular tantalum powder is from 1:0.4 to 1:0.7.

12. The tantalum powder according to claim 10, wherein the ratio of the flake tantalum powder to the granular tantalum powder is from 1:0.4 to 1:0.8.

13. The tantalum powder according to claim 10, wherein the proportion of −400 mesh tantalum powder having a flake+block structure is from 25 to 35%.

14. A capacitor comprising an anode block wherein the anode block comprises the tantalum powder having the flake+block structure as recited in claim 10.

* * * * *